United States Patent
Zheng

(10) Patent No.: US 8,375,934 B2
(45) Date of Patent: Feb. 19, 2013

(54) SOLAR WATER HEATER RETROFITTED FROM CONVENTIONAL WATER HEATER, SYSTEM AND METHOD

(75) Inventor: Ke Ting Zheng, Henderson, NV (US)

(73) Assignee: Shanghai Jite Enterprise Co., Ltd., Shanghai (CN)

( * ) Notice: Subject to any disclaimer, the term of this patent is extended or adjusted under 35 U.S.C. 154(b) by 0 days.

(21) Appl. No.: 12/816,387

(22) Filed: Jun. 16, 2010

(65) Prior Publication Data
US 2011/0139144 A1 Jun. 16, 2011

(51) Int. Cl.
*F24J 2/40* (2006.01)
(52) U.S. Cl. ...... 126/588; 126/615; 126/714; 122/13.01
(58) Field of Classification Search ............ 126/615, 126/610, 635, 714, 588; 165/104.21; 122/13.01–19.2; 237/19, 13; 60/641.8
See application file for complete search history.

(56) References Cited

U.S. PATENT DOCUMENTS

| | | | | |
|---|---|---|---|---|
| 4,010,734 A | * | 3/1977 | Chayet | 126/587 |
| 4,052,000 A | * | 10/1977 | Honikman | 126/592 |
| 4,119,085 A | * | 10/1978 | Knowles et al. | 126/636 |
| 4,119,087 A | * | 10/1978 | Cook | 126/588 |
| 4,126,122 A | * | 11/1978 | Bross | 126/586 |
| 4,133,338 A | * | 1/1979 | Honikman | 126/588 |
| 4,210,125 A | * | 7/1980 | Fender | 126/587 |
| 4,299,203 A | * | 11/1981 | Skopp | 126/638 |
| 4,319,561 A | * | 3/1982 | Pei | 126/714 |
| RE31,032 E | * | 9/1982 | French | 126/637 |
| 4,403,602 A | * | 9/1983 | Warden | 126/610 |
| 4,416,222 A | * | 11/1983 | Staats | 122/19.1 |
| 4,438,759 A | * | 3/1984 | Kitajima et al. | 126/635 |
| 4,474,170 A | * | 10/1984 | McConnell et al. | 126/636 |
| 4,479,487 A | * | 10/1984 | Migdal | 126/588 |
| 4,505,261 A | * | 3/1985 | Hunter | 126/635 |
| 4,513,732 A | * | 4/1985 | Feldman, Jr. | 126/570 |
| 4,686,961 A | * | 8/1987 | Garrison | 126/635 |
| 5,103,802 A | * | 4/1992 | Thomason | 126/610 |
| 6,655,375 B2 | * | 12/2003 | Terraneo | 126/639 |
| 2007/0227529 A1 | * | 10/2007 | Rubio et al. | 126/614 |
| 2010/0031953 A1 | * | 2/2010 | Penev et al. | 126/615 |

(Continued)

FOREIGN PATENT DOCUMENTS

DE 100 10 752 A1 * 9/2001
JP 56071768 A * 6/1981

(Continued)

OTHER PUBLICATIONS

Utility Model Patent authorized by Intellectual Property Bureau of PRC (Certificate in Chinese, translated copy included).

(Continued)

*Primary Examiner* — Steven B McAllister
*Assistant Examiner* — Desmond Peyton

(57) ABSTRACT

A solar energy water heater system composed of a method of retrofitting an existing conventional gas or electric water heater. In particular, this invention relates to adding a solar energy water heater system comprised of: a solar collector, a solar thermal circulating loop, an over-heat protection loop, and a computer controller with temperature sensors. The solar thermal circulating loop and over-heat protection loop are installed on the existing water storage tank, and the method and system is disclosed herein.

4 Claims, 1 Drawing Sheet

U.S. PATENT DOCUMENTS

| | | | |
|---|---|---|---|
| 2010/0096018 A1* | 4/2010 | Wylie et al. | 137/2 |
| 2010/0170092 A1* | 7/2010 | Mills | 29/890.033 |
| 2010/0195991 A1* | 8/2010 | Deivasigamani et al. | 392/308 |
| 2010/0257882 A1* | 10/2010 | Penev et al. | 62/235.1 |
| 2011/0017201 A1* | 1/2011 | Yang | 126/610 |
| 2011/0203572 A1* | 8/2011 | Jackman | 126/591 |

FOREIGN PATENT DOCUMENTS

| | | | |
|---|---|---|---|
| JP | 56080656 A * | 7/1981 | |

OTHER PUBLICATIONS

PCT International Search Report by International Examination Unit of Intellectual Property Bureau of PRC (Report in Chinese, translated copy).

PCT International Examination Unit Written Opinion (Written Opinion in Chinese, translated copy inculded).

* cited by examiner

SOLAR WATER HEATER RETROFITTED FROM CONVENTIONAL WATER HEATER, SYSTEM AND METHOD

CROSS REFERENCE TO RELATED APPLICATIONS

This application claims priority to Chinese Patent Application No. 201010154644.8, filed Apr. 26, 2010 and Chinese Patent Application No. 201020169035.5, filed Apr. 26, 2010 which are incorporated herein by reference.

BACKGROUND OF THE INVENTION

A conventional water heater used in homes and commercial properties provides hot water by heating water using gas or electricity energy. A conventional water heater is comprised of: a tank, a dip tube, a heating mechanism, a thermostat, a heat out pipe, a drain valve, a shut off valve, and a temperature and pressure relief valve. The tank is a container storing a volume of hot water. Water enters through the dip tube at the top of the tank and travels to the bottom where it is heated by a heating mechanism. The heating mechanism is either made up of heating elements in an electric water heater or a burner in a gas water heater. The heating mechanism heats the water, and the hot water rises to the top of the tank. An exhaust fume channel has to be installed with a gas water heater for carbon dioxide ($CO_2$) emission. Hot water exits through the heat out pipe located at the top of the tank. The thermostat controls the heating mechanism inside the tank. The drain valve is used to empty the tank. The shut-off valve stops water from entering the tank. The temperature and pressure relief valve is a safety component used to keep the temperature and pressure within the tank consistent and within safe measures.

These conventional gas or electric domestic water heaters are widely used and are inherently inefficient. They consume large amounts of traditional energy and discharge large quantities of carbon emissions. Solar energy is clean and reduces the amount of traditional energy needed while reducing carbon emissions. To completely re-install solar heated water heaters into every home and commercial business is cost prohibitive. Therefore, there is a need to retrofit pre-existing water heaters into a solar water heater.

SUMMARY OF THE INVENTION

This invention relates to solar energy application, structures, and retrofitting methods on a conventional water heater. In particular, this invention relates to adding a solar energy water heater system comprised of: a solar collector, a solar thermal circulating loop, an over-heat protection loop, and a computer controller with temperature sensors. This specially designed system and method, changes the conventional gas or electric water heater into a solar energy water heater system.

Those skilled in the art will recognize that the concepts, structures, systems, and methods of this disclosure may be implemented in many manners and as such this disclosure is not to be limited by the exemplary embodiments and examples set forth herein. While the particular embodiments as shown and disclosed herein are fully capable of providing the features and advantages described herein, it is to be understood that it is merely illustrative of some embodiments of the invention and that no limitations are intended to the details of construction or design herein shown other than as described in the appended claims.

BRIEF DESCRIPTION OF THE FIGURES

So that those having ordinary skill in the art to which at least some embodiments of the invention pertains will more readily understand how to make and use systems, devices and methods in accordance therewith, such embodiments thereof will be described in enabling detail herein below with reference to the drawings. It should be noted that the drawings are not necessarily drawn to scale and certain figures may be shown in other form for illustrative reasons.

DETAILED DESCRIPTION OF THE INVENTION

Figure 1:
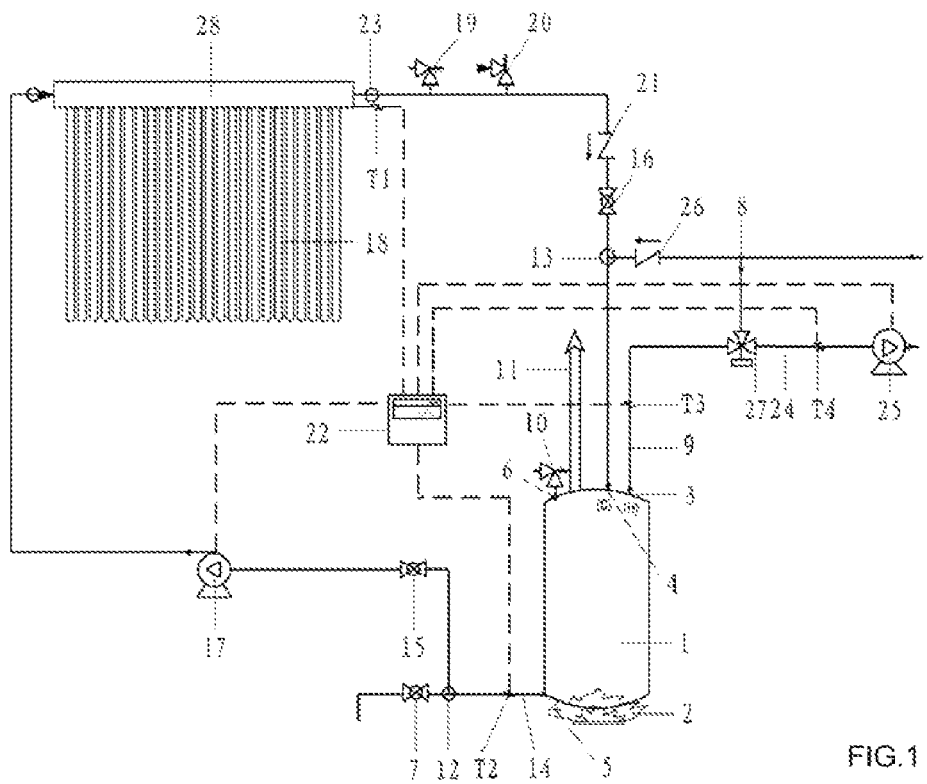
FIG. 1 illustrates a conventional water heater retrofitted with the core functional components of the solar energy water heater system according to the invention system and method.

FIG. 1 depicts the solar energy water heater system retrofitted onto a conventional gas water heater in accordance with the embodiments of the invention. In this embodiment, the invention is a retrofitted solar water heater system which builds a new solar thermal circulating loop and an over-heat protection loop on to the existing gas water heater. The conventional gas water heater system is comprised of: a storage tank 1, a gas heater 2, a hot water outlet 3, a cold water inlet 4, a water drain 5, a temperature and pressure relief 6, a drain valve 7, a cold water supply pipe 8, a heat out pipe 9, a temperature and pressure relief valve 10, and a thermostat that is built with the gas heater 2.

In this embodiment, the storage tank 1 has a built-in gas heater 2 at the bottom of the tank that heats the water to a certain predetermined temperature, that temperature being set and maintained by the thermostat and the gas heater. The storage tank 1 is generally built with four holes: hot water outlet 3, dip tube 4, water drain 5, and temperature and pressure relief 6, which are connected to the system by the drain valve 7, the cold water supply pipe 8, the heat out pipe 9, and the temperature and pressure relief valve 10. In a conventional gas water heater, an exhaust fume channel 11 is installed.

The solar water heater retrofit is comprised of a solar thermal cycle loop and an over-heat protection loop. The solar thermal cycle loop is comprised of: three-way connector 12 and 13, extension pipe 14, ball valve 15 and 16, circulating pump 17, solar collector header infrastructure 28, outside pressure relief valve 19, air vent valve 20, one-way directional valve 21 and 26, computer controller 22, temperature sensor T1 and T2, and outlet 23. The over-heat protection loop is comprised of: the heat out pipe 9, temperature sensor T3 and T4, a hot water supply pipe 24, a circulating pump 25, and a mixing valve 27.

FIG. 1 depicts the solar thermal cycle loop as follows: the first three-way connector 12 is the inlet of the solar thermal cycle loop. This connects through the circulating pump 17 to the solar collector header infrastructure 28's one end, then to the other end of the solar collector header infrastructure 28 outlet 23, through an outside pressure relief valve 19, an air vent valve 20, then to the first one-way directional valve 21, and then finally connects to the second three-way connector 13, also called the outlet of the solar thermal cycle loop. The first three-way connector 12 forms the start of the solar thermal cycle loop inlet and three-way connector 13 forms the solar thermal cycle loop outlet or the end. The three-way connector 13 is installed on the cold water supply pipe 8 and connects the solar thermal cycle loop to the existing storage tank 1. An extension pipe 14 is added between the storage water tank drain 5 and the drain valve 7. Extension pipe 14 creates the base for installing three-way connector 12. Ball valve 15 is connected after three-way connector 12, and before circulating pump 17. Water circulating pump 17 is connected between the solar thermal loop inlet and outlet to push the water in one direction going through the collector header infrastructure 28. Ball valve 16 is connected into the loop before the three-way connector 13. The ball valve 15 and 16 are connected at both sides of the solar thermal cycle loop to provide isolation function when needed.

Ball valve 15 and 16 do not affect the solar thermal cycle loop's normal function. One-way directional valve 21 connected to the outlet of the solar thermal cycle loop prevents the cold supply water provided by the pipe 8 from entering the solar thermal cycle loop. The second one-way directional valve 26 connected from the cold water supply pipe 8 to the said solar thermal cycle loop outlet prevents the solar thermal circulating hot water inside the cycle loop from entering into the cold water supply pipe 8.

In another embodiment, it is preferred that two additional valves are included in the solar thermal circulating loop: one pressure relief valve and one air vent valve at the position of the solar collector header infrastructure outlet point. It is also preferred to install a temperature mixing valve in the water storage heat out pipe, which will regulate the hot water temperature in the home hot water supply pipe.

In another embodiment, a thermal energy meter could be installed at the output of the solar collector header infrastructure to measure the thermal energy generated by the solar system.

FIG. 1 depicts four temperature sensors, temperature sensor T1, T2, T3, and T4. T1 is installed at the outlet 23 of the solar collector header infrastructure 28. T2 is installed at the extended pipe 14. T3 is installed at the heat out pipe 9. T4 is installed at the home hot water supply pipe 24. Temperature sensors take temperature readings at these points and these measurements are reported back to the computer controller 22 so that it can control circulating pump 17 and 25 be turned-on or turned-off through electric connections, and thereby control the temperatures in the solar energy water heater system.

Temperature sensor T1 measures the temperature at the outlet 23 and temperature sensor T2 measures the temperature of the tank bottom water or the inlet of the solar thermal cycle loop. The computer controller 22 reads the temperature at temperature sensor T1, at temperature sensor T2, and the difference between them. The below Equation (1) explains the difference measurement that the computer controller 22 manages.

$$\Delta T = T1 - T2 \qquad \text{Equation (1)}$$

In this embodiment, the sunlight heats the solar collector formed by all glass double-layer vacuum tube (with heat pipe inside) 18 and the solar energy is changed into heat, and the said heat is transferred to the collector header infrastructure 28 and the temperature at temperature sensor T1 rises. The computer controller 22 is constantly checking the temperature difference $\Delta T$. The computer controller 22 triggers the circulating pump 17 when a threshold temperature difference $\Delta T$ is reached, for example $\Delta T$ equals 8° F. The circulating pump 17 is turned on regulates the flow of water from the bottom of the existing tank, through solar collector header infrastructure 28 back to the tank transferring solar heating energy into the storage tank 1. The circulating pump 17 is turned off by the computer controller 22 when the temperature difference $\Delta T$ reaches a lower value, for example $\Delta T = 3°$ F.

In one embodiment, part of the solar cycle loop pipes connecting the collector header infrastructure 28 could be installed outside the home or building and because it is out in the environment, it could encounter severe cold weather. Since this retrofitting solar water heater system is running the storage tank 1 inside potable water through the solar thermal circulating cycle loop into the solar collector header infrastructure 28 and returning, the solar water heater system must have the ability to prevent the solar collector header infrastructure 28 and the circulating pipes from being frozen. The computer controller 22 manages the temperature sensor T1 temperature by comparing a user preset frozen protection temperature, for example 35° F. If the temperature sensor T1 has reached the said frozen protection temperature, the computer controller 22 turns on the circulating pump 17 and begins to move the warmer water at temperature sensor T2 from the storage tank 1 to the solar collector header infrastructure flowing through the complete solar thermal cycle loop. Once the temperature sensor T1 temperature increases to the certain predetermined temperature above the said preset frozen protection temperature, the computer controller 22 stops the circulating pump 17.

FIG. 1 depicts the over-heat protection loop as follows: the second circulating pump 25 is connected to the hot water supply pipe 24. A mixing valve 27 is connected to the cold water supply pipe 8 and to the heat out pipe 9 to regulate the output hot water temperature flowing to the hot water supply pipe 24. The temperature sensor T3 provides the water storage tank 1 high temperature protection. The temperature sensor T3 measures the temperature of the water at the heat out pipe 9. If the temperature reaches the highest allowed water temperature set up by the user, the computer controller 22 will send out control signal to prevent the solar circulating pump 17 from running. This is regardless of the said temperature difference $\Delta T$ reaching the user preset pump 17 turn-on value. The computer controller 22 is able to control circulating pump 25 to be turned on circulating hot water through the house existing piping system, which is not pictured in the FIG. 1, to prevent the tank water temperature from exceeding the threshold temperature protection point.

For example, in the summer when the solar energy reaches the maximum, the water temperature in the tank could potentially be heated to its highest point. The solar water heater system resolves the over-heating issue with a computer controlled protection function: when the computer controller 22 reads the temperature T3 to a threshold highest temperature allowed, for example temperature sensor T3 measures 190° F., the computer controller 22 will turn on the circulating pump 25, which circulates the hot water from the tank through the heat out pipe 9 and the house existing pipe system dissipating the heat on its circling.

In one embodiment, in order to prevent the storage tank water from over-heating, the original drain valve is replaced by a solenoid valve. When the storage tank water temperature reaches the highest temperature allowed, the controller turns on the solenoid valve, which opens directly draining the hot water out the system.

The temperature sensor T4 measures the hot water supply pipe line 24 temperature and that value is also reported to the computer controller 22. When the temperature sensor T4 temperature value is lower than a user preset temperature value, the computer controller 22 turns on the circulating pump 25 to enabling the hot water in the pipe to increase temperature to the preset temperature.

The computer controller 22 can provide at least three outputs: output signal to control water circulating pump 17, an output signal to control the second water circulating pump 25 connected in the hot water supply pipe 24, or used to control the above said solenoid valve connected at the end of pipe 14 replacing the original drain valve of the water tank, and an output signal to control the back-up heating mechanism. The original heating mechanism can still be used as a backup source of thermal energy, which can be turned on or turned off by the conventional gas water heater temperature controlled thermostat built with the gas heater.

Figures 2, 2A:
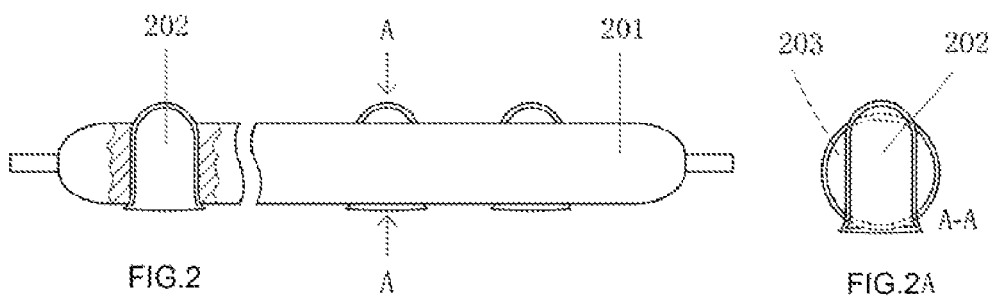
FIG. 2 shows a side view of the solar collector header inside infrastructure for use as part of the solar thermal cycle loop.
FIG. 2A shows a cross-section view of a dry thermalwell inside the above said FIG. 2 solar collector infrastructure.

FIG. 2 illustrates the inside of solar collector header infrastructure 28. The solar collector header infrastructure 28 is comprised of: a header pipe 201, a number of dry thermalwells 202, the space 203 inside the header pipe 201. The dry thermalwell 202 inside is placed with the heat pipe's condenser, which is not pictured in the FIG. 2 and FIG. 2A, and the heat pipe itself is placed inside an all glass double-wall vacuum tube, which is not pictured in the FIG. 2 and FIG. 2A either. Because each heat pipe's condenser is placed inside each dry thermalwell, and the heat pipe is placed itself inside the all glass double-wall vacuum tube, so the number of the heat pipe or the number of the all glass double-wall vacuum tube are the same number as the dry thermalwell number on the header pipe 201. The number of all glass double-wall vacuum tube with the inside heat pipe, and the collector header infrastructure 28 compose the solar collector. The solar collector header infrastructure 28 inside header pipe 201 could be made of copper or stainless steel. The dry thermalwells made of the same material of the header pipe 201 vertically soldered onto the header pipe 201. In FIG. 2A, the water flows through the header pipe space 203 taking the thermal energy collected from the dry thermalwell and heats the water. The solar energy is transformed from the heat pipe's condenser placed inside the dry thermalwell 202 and thus heats the water circulating through the header pipe space 203. The water never enters the dry thermalwell 202 inside or the all glass double-layer vacuum tube, it only passes through the header pipe space 203. The solar collector collects solar thermal energy as water flows across the series of dry thermalwells. The heated water carries the thermal energy flow back into the storage tank 1 completing the solar thermal cycle loop.

In one embodiment, the all glass double-layer vacuum tube 18 provides the best known insulation and gives the advantage that it can work no matter how hot or cold the environment is. The condenser of the heat pipe inside the all glass double-layer vacuum tube is tightly placed inside the dry thermalwell 202 and it continuously transfers the thermal energy retained inside the tube no matter how cold the collector environment is. The solar collector header infrastructure 28 is well insulated by insulation material to prevent the water inside from being frozen.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Indeed, many modifications and variations of the embodiments of the invention are possible in light of the above teachings, and the invention may be practiced otherwise than as specifically described yet remain within the scope of the appended claims and equivalents thereof.

While exemplary methods, systems, devices and applications thereof of the present disclosure, have been described herein, it should also be understood that the foregoing is only illustrative of exemplary embodiments, as well as principles of the invention, and that various modifications can be made by those skilled in the art without departing from the scope and spirit of the invention. Various modifications to these embodiments will be readily apparent to those skilled in the relevant art, and principles defined herein may be applied to other embodiments. Thus, the claims are not intended to be limited to the embodiments shown and described herein, but are to be accorded the full scope consistent with the language of the claims, wherein reference to an element in the singular is not intended to mean "one and only one" unless specifically stated, but rather "one or more." All structural and functional equivalents to the elements of the various embodiments described throughout this disclosure that are known or later come to be known to those of ordinary skill in the relevant art are expressly incorporated herein by reference and intended to be encompassed by the claims. Moreover, nothing disclosed herein is intended to be dedicated to the public regardless of whether such disclosure is explicitly recited in the claims.

What is claimed is:

1. A solar water heater system retrofitting method, comprising the following steps:
   a) adding a solar thermal circulating loop to an existing conventional gas or electric heated water heater storage tank having a tank bottom drain hole, a tank drain valve a tank old water supply pipe and a tank heat out pipe, wherein the solar thermal circulating loop is formed by a solar thermal circulating pump, a heat pipe vacuum tube solar collector, a pressure releasing valve, an air vent valve, a first one-way direction valve and a computer controller;
   b) installing an extension pipe between the tank bottom drain hole and the tank drain valve;
   c) installing two three-way connectors in the solar thermal circulating loop wherein the first three-way connector is installed in the extension pipe, and the second three-way connector is installed in the tank cold water supply pipe, such that the two three-way connectors' outlets form the solar thermal circulating loop's inlet and outlet;
   d) installing the first and a second one-way direction valves wherein the first one-way direction valve is installed at the end of the solar thermal circulating loop to prevent the cold supply water from entering the solar thermal circulating loop, and the second one-way direction valve is installed in the tank cold water supply pipe in front of the second three-way connector to prevent the solar thermal circulating hot water from entering the cold water supply pipe;
   e) installing four temperature sensors wherein the first sensor T1 is installed at the solar collector outlet, the second sensor T2 is installed at the storage tank bottom drain hole extension pipe, the third sensor T3 is installed at the tank heat out pipe, and the fourth sensor T4 is installed at the home hot water supply pipe;
   f) installing the computer controller, wherein the computer controller provides solar thermal circulating control to the system, configures the four sensors T1, T2, T3 and T4 as the computer controller's inputs, provides at least three outputting control signals including two outputting signals to control two circulating pumps working in this retrofitting system, a third outputting signal to control a turn-on or turn-off switch to control the original gas or electric heater, if the original gas or electric heater does not have a thermostat;

g) installing a temperature mixing valve on the home hot water supply pipe to prevent the hot water supplying to the end user from being above a desired temperature;

h) installing an over-heat protection loop with the second solar thermal circulating pump in the home hot water supply pipe for being able to circulate the hot water when the storage tank water temperature reaches the highest set temperature; wherein the over-heat protection loop is comprised of: the tank heat out pipe, the temperatures sensors T3 and T4, the home hot water supply pipe, the second solar thermal circulating pump the mixing valve, and the home existing hot and cold water supply pipes reaching to the furthest faucet;

i) installing two ball valves at the solar thermal circulating loop inlet and outlet to perform the function of shutting off the circulating loop to the original gas or electric water heater;

j) installing a thermal energy meter at the solar collector outlet to provide the solar thermal energy generated during a time period.

2. The method of claim 1, wherein the installed heat pipe vacuum tube solar collector comprises a well insulated copper or stainless steel header pipe on which number of dry thermalwells are vertically soldered at an equal distance from one another, the condensers of the heat pipes being placed in the dry thermalwells, and the heat pipe being centrally placed in an all glass coaxial double-layer vacuum tube, wherein the space within the glass tube double-layer is vacuumed, such that there is no water touching the heat pipe and flowing into the all glass double-layer vacuum tube.

3. The method of claim 1, wherein the computer controller controls the solar thermal energy circulating to the storage tank when the sun provide energy to heat the water and control functions for the solar water heater system to automatically work uninterrupted for four seasons, these program functions include preventing the solar collector from reaching a water temperature below freezing, preventing the solar collector from reaching a water temperature above a preset maximum temperature level, preventing storage tank water from reaching a water temperature above a preset temperature level, wherein the controller works with the temperature sensor readings from the solar collector output temperature, the storage water tank's lowest and highest recommended temperatures, the home hot water supply pipe temperature, and operates the solar thermal circulating pump, the hot water circulating pump and the existing gas or electric heater accordingly.

4. The method of claim 1, wherein the existing water heater's gas or electric heater operates as a back-up heating system for the thermal circulating loop.

\* \* \* \* \*